US009150444B2

(12) United States Patent
Frazier (10) Patent No.: US 9,150,444 B2
(45) Date of Patent: Oct. 6, 2015

(54) SOLID DISSOLVER SYSTEM FOR TREATMENT OF WASTE MATERIAL

(71) Applicant: UNITED LABORATORIES, INC., St. Charles, IL (US)

(72) Inventor: Eric D. Frazier, Marengo, IL (US)

(73) Assignee: UNITED LABORATORIES, INC., St. Charles, IL (US)

( * ) Notice: Subject to any disclaimer, the term of this patent is extended or adjusted under 35 U.S.C. 154(b) by 0 days.

(21) Appl. No.: 13/842,708

(22) Filed: Mar. 15, 2013

(65) Prior Publication Data

US 2014/0263044 A1 Sep. 18, 2014

(51) Int. Cl.
| | | |
|---|---|---|
| C02F 3/00 | (2006.01) | |
| C02F 1/00 | (2006.01) | |
| C02F 1/52 | (2006.01) | |
| C02F 1/72 | (2006.01) | |
| C02F 1/68 | (2006.01) | |

(52) U.S. Cl.
CPC ... *C02F 3/00* (2013.01); *C02F 1/00* (2013.01); *C02F 1/52* (2013.01); *C02F 1/688* (2013.01); *C02F 1/72* (2013.01)

(58) Field of Classification Search
CPC .............. C02F 3/00; C02F 1/688; C02F 1/00; C02F 1/52; C02F 1/72
USPC .................. 210/610, 632, 758–759, 205–206
See application file for complete search history.

(56) References Cited

U.S. PATENT DOCUMENTS

| | | | |
|---|---|---|---|
| 3,989,596 A | 11/1976 | Long | |
| 4,826,661 A | 5/1989 | Copeland et al. | |
| 5,770,079 A | 6/1998 | Haase | |
| 5,807,724 A | 9/1998 | Resnick | |
| 5,925,252 A * | 7/1999 | Cline | 210/606 |

(Continued)

FOREIGN PATENT DOCUMENTS

WO    WO-2011/149651 A1    12/2011

OTHER PUBLICATIONS

Chemtura Corporation, bacillus subtilis Material Safety Data Sheet (2007).

(Continued)

*Primary Examiner* — Chester Barry
(74) *Attorney, Agent, or Firm* — Marshall, Gerstein & Borun LLP (57) ABSTRACT

A solid dissolver system for the treatment of waste material in a waste water collection system. The solid dissolver system includes a housing. The housing includes a cover and a platform portion for receiving the cover. A cartridge containing agents for the treatment of waste material is disposed within the cover, the cover substantially surrounding and enveloping the cartridge, the cover including an opening. A water inlet is provided into the housing, the water inlet terminating at a spray means disposed proximate to or inside the cover opening, the spray means being capable of directing water at an exposed surface of the cartridge, the platform portion being capable of collecting any effluent from the water directed at the exposed surface of the cartridge by the spray means. A water outlet for channeling the effluent into a waste water collection system is included in the platform portion. The cartridge includes an inner core and an outer portion partially surrounding the inner core such that at least one surface of the inner core is exposed. The inner core has a greater water solubility than the outer portion.

27 Claims, 4 Drawing Sheets

(56) References Cited

U.S. PATENT DOCUMENTS

| | | | |
|---|---|---|---|
| 6,039,875 | A | 3/2000 | Christiansen et al. |
| 6,150,316 | A | 11/2000 | Scepanski |
| 6,156,715 | A | 12/2000 | Lentsch et al. |
| 6,248,234 | B1 | 6/2001 | Cline |
| 6,248,324 | B1 | 6/2001 | Fischetti et al. |
| 6,325,934 | B1 | 12/2001 | Tobey, Jr. et al. |
| 6,428,701 | B1 | 8/2002 | Mullennix et al. |
| 6,820,661 | B1 * | 11/2004 | Heimert ............ 141/198 |
| 7,148,033 | B2 | 12/2006 | Brenner et al. |
| 7,658,851 | B2 | 2/2010 | Nelson et al. |
| 7,828,975 | B2 | 11/2010 | Oya |
| 2004/0040903 | A1 | 3/2004 | Burke et al. |
| 2005/0040116 | A1 | 2/2005 | Purdy et al. |
| 2006/0011538 | A1 | 1/2006 | Mussari et al. |
| 2006/0122086 | A1 | 6/2006 | Albu et al. |
| 2006/0272205 | A1 | 12/2006 | Bissonnette et al. |
| 2008/0017574 | A1 | 1/2008 | Lenger et al. |
| 2008/0169239 | A1 | 7/2008 | Sparks et al. |
| 2009/0054287 | A1 | 2/2009 | Smith et al. |
| 2009/0148573 | A1 | 6/2009 | Kitamura et al. |
| 2009/0283466 | A1 | 11/2009 | Martin et al. |
| 2011/0293481 | A1 * | 12/2011 | Eanes et al. .......... 422/106 |
| 2012/0255901 | A1 * | 10/2012 | Thorgersen et al. ........ 210/606 |
| 2012/0298577 | A1 | 11/2012 | Thorgersen et al. |

OTHER PUBLICATIONS

Megazyme International Ireland, bacillus licheniformis, Material Safety Data Sheet. Retrieved on Dec. 16, 2013.

International Search Report and Written Opinion for Application No. PCT/US2013/038170, dated Nov. 7, 2013.

"Innovative Formulations Inc., Catalog," Microxyme Bio-Remediation Technologies (2009). Retrieved from the Internet on Mar. 8, 2011: URL:http://www.innovationonline.com/pdfs/catalog/microxyme-brochure.pdf.

"Material Safety Data Sheet," Grotek Manufacturing Inc. (2001). Retrieved from the Internet on Mar. 9, 2011:URL:http://www.hydrofarm.com/downloads/fc/GT%20oxycal_31687.pdf.

"Multi-Strain Spore Based Formulation: High Impact Grease Digester of Lift Stations, Collection Systems, Municipalities or Industries," MicroClear 1XF-HC (2003). Retrieved from the Internet on Mar. 16, 2011: URL:http://www.environmentalleverage.com/microclear1xfhc.htm.

"OxyCal—Oxygen Generating Compound," Rex-Bac-T © Technologies (2009). Retrieved from the Internet on Mar. 16, 2011: URL:http://www.rex-bac-t.com/p-45-oxycal-oxygen-generating-compound.aspx.

"Septic Tank Treatment—Economy Paks (EP-303)," Rex-Bac-T © Technologies (2009). Retrieved from the Internet on Mar. 16, 2011: URL:http://rexbact.net/p-18-septic-tank-treatment-economy-paks-ep-303.aspx.

"Solid Slow-Dissolving Bacterial Block," Pro Chem—Bio Block (2011). Retrieved from the Internet on Mar. 7, 2011: URL:http://www.procheminc.com/product_details.asp?ID=93&cat=2.

"Solid Slow-Dissolving Bacterial Block: Product Information Sheet," Pro Chem—Bio Block #3423 (2011). Retrieved from the Internet on Mar. 7, 2011: URL:http://www.procheminc.com/prod-docs/BIO_BLOCK[2].pdf.

Chem-Aqua™, "Biological Wastewater Treatment for Food Processing," (2012).

Chem-Aqua™, "ECO Bionics® BIO-Amp™," (2011).

Chem-Aqua™, "ECO Bionics® DrainCobra™," (2011).

Chem-Aqua™, "FREE-FLOW™ Biological Drain Maintenance Systems," (2012).

ECO Bionics®, "Bioamp Biological System," (2005).

EnduroSolv, "What is EnduroSolv®?," (2013). Retrieved from the Internet on Jan. 22, 2013: URL:http://www.endurosolv.com.

Material Safety Data Sheet: ECO Bionics FREE-FLOW (2012).

Material Safety Data Sheet: ECObionics FREE-FLOW Venom (2012).

Roheim, "Low Cost Automated on Site System for Growing and Dispensing Vegetative Bacteria," (2005).

The EnduroSolv Solution, "Twelve Principles of Green Chemistry," (1998).

United 982 Material Safety Data Sheet (2012).

United 983 Material Safety Data Sheet (2011).

United Laboratories, "New Improved Formulation Enriched with Proprietary Micro-Nutrient Package," (2013).

United Laboratories, "United 982 $O_2$ PLUS Slow Release with Inter-Core Technology," (2013).

United Laboratories, "United 983 I-C Grease Trap Maintainer with Inter-Core Technology," (2013).

* cited by examiner

SOLID DISSOLVER SYSTEM FOR TREATMENT OF WASTE MATERIAL

FIELD OF INVENTION

The invention is generally related to a solid dissolver system for the treatment of waste material in a waste water collection system and methods of using same.

BACKGROUND OF THE INVENTION

Sewage is the spent water carrying body wastes, washing water, food preparation wastes, laundry wastes, and other waste products. Sewage from individual residential and commercial outflows is typically collected and processed at a central treatment plant. At the central treatment plant, sewage is treated to various stages to allow the resulting product to pass back into the ecological system. Certain types of sewage outflows have high contents of organic matter such as greases. Such organic matter can clog sewage collection systems prior to the sewage reaching the central sewage treatment plant, thereby substantially disrupting the treatment process, particularly at the lift/pumping stations frequently located along the sewage transport lines which transport the sewage to a higher elevation. Because of their utilization of pumping to transport sewage, lift stations serve as a collection point for grease and other organic matter that is not decomposed within the water flow. It is typical to regularly clean out lift stations (and other junction points in the system where floating grease and other organic matter collects) by pumping the grease and organic matter to a secondary reservoir such as a vacuum truck.

Bacterial augmentation has been implemented to maximize the effectiveness of organic decomposition in order to mitigate the problem of frequent removal of the floating grease and organic matter from lift stations (and other junction points). For example, bacteria with high capacity for increasing the decomposition of grease and other organic matter have been charged into sewage systems. Such bacteria reduce the amount of grease by converting it to lower molecular weight compounds which do not readily accumulate/agglomerate within the sewage collection system. These bacteria operate almost exclusively in the water phase and their cultures grow in the grease and water interface, on the sides and on the bottom of the tank or trap in which they are placed.

However, bacteria which compete with the added supplemental bacteria constantly enter the system with the continuous inflows of fresh sewage. Consequently, the supplemental bacteria must be replenished frequently, often daily. Liquid compositions containing bacteria can be pumped into lift stations systems but the dispensing equipment takes up needed space and as stated previously the bacteria must be added frequently.

U.S. Pat. No. 5,925,252 describes a bioremediation device for biological degradation of a waste material in a collection system. The disclosed bioremediation device comprises a bioactive element having at least one active ingredient present in a variable concentration, said variable concentration being greatest substantially at the outside of said bioactive element and being least within the bioactive element, so that the bioremediation effect of the element is greatest when the waste material is first exposed to the outside of the bioactive element and lessens as the bioactive element dissolves in the waste materials. The '252 patent remediation device thereby purports to accomplish both an initial stronger effect to achieve reduction in the grease and other organic materials in the collection system and then a diminishing effect to sustain maintenance of the remediation effect in the collection system.

SUMMARY OF THE INVENTION

In one embodiment, the invention provides a solid dissolver system for the treatment of waste material in a waste water collection system comprising a housing comprising a cover and a platform portion for receiving the cover; a cartridge containing agents for the treatment of waste material, the cartridge being disposed within the cover, the cover substantially surrounding and enveloping the cartridge, the cover comprising an opening; a water inlet into the housing, the water inlet terminating at a spray means disposed proximate to or inside the cover opening, the spray means being capable of directing water at a surface of the cartridge, the platform portion being capable of collecting any effluent from the water directed at the surface of the cartridge by the spray means; and a water outlet for channeling the effluent into a waste water collection system, wherein the cartridge comprises at least one inner core comprising a first water-soluble material, the inner core further comprising an inner agent selected from the group consisting of oxygen generating materials, enzymes, bacteria, nutrients, flocculants, and mixtures thereof, and an outer portion comprising an outer agent distributed in a binder matrix of a second water-soluble material, the outer portion partially surrounding the inner core such that at least one surface of the inner core is exposed along the surface of the cartridge, the outer agent being selected from the group consisting of oxygen generating materials, enzymes, bacteria, nutrients, flocculants, and mixtures thereof, the outer agent being the same or different from the inner agent, and the first water-soluble material of the inner core having a greater water solubility than the second water-soluble material of the outer portion.

In a related embodiment, the invention provides a method of treating waste material in a waste water collection system, the method comprising providing a solid dissolver system for the treatment of waste material in a waste water collection system, the solid dissolver system comprising a housing comprising a cover and a platform portion for receiving the cover; a cartridge containing agents for the treatment of waste material, the cartridge being disposed within the cover, the cover substantially surrounding and enveloping the cartridge, the cover comprising an opening; a water inlet into the housing, the water inlet terminating at a spray means disposed proximate to or inside the cover opening, the spray means being capable of directing water at a surface of the cartridge, the platform portion being capable of collecting any effluent from the water directed at the surface of the cartridge by the spray means; and a water outlet for channeling the effluent into a waste water collection system, wherein the cartridge comprises at least one inner core comprising a first water-soluble material, the inner core further comprising an inner agent selected from the group consisting of oxygen generating materials, enzymes, bacteria, nutrients, flocculants, and mixtures thereof, and an outer portion comprising an outer agent distributed in a binder matrix of a second water-soluble material, the outer portion partially surrounding the inner core such that at least one surface of the inner core is exposed along the surface, the outer agent being selected from the group consisting of oxygen generating materials, enzymes, bacteria, nutrients, flocculants, and mixtures thereof, the outer agent being the same or different from the inner agent, and the first water-soluble material of the inner core having a greater water solubility than the second water-soluble material of the outer portion; spraying water from the spray means onto the exposed surface of the cartridge to dissolve the first water-soluble material and/or the second water-soluble material to form a concentrated solution containing the inner agent and/or the active agent; and, collecting and directing the concentrated solution into the waste water collection system.

DETAILED DESCRIPTION

The invention advantageously provides a solid dissolver system for the treatment of waste material in a waste water collection system comprising a housing comprising a cover and a platform portion for receiving the cover; a cartridge containing agents for the treatment of waste material, the cartridge being disposed within the cover, the cover substantially surrounding and enveloping the cartridge, the cover comprising an opening; a water inlet into the housing, the water inlet terminating at a spray means disposed proximate to or inside the cover opening, the spray means being capable of directing water at a surface of the cartridge, the platform portion being capable of collecting any effluent from the water directed at the surface of the cartridge by the spray means; and a water outlet for channeling the effluent into a waste water collection system, wherein the cartridge comprises at least one inner core comprising a first water-soluble material, the inner core further comprising an inner agent selected from the group consisting of oxygen generating materials, enzymes, bacteria, nutrients, flocculants, and mixtures thereof, and an outer portion comprising an outer agent distributed in a binder matrix of a second water-soluble material, the outer portion partially surrounding the inner core such that at least one surface of the inner core is exposed along the surface of the cartridge, the outer agent being selected from the group consisting of oxygen generating materials, enzymes, bacteria, nutrients, flocculants, and mixtures thereof, the outer agent being the same or different from the inner agent, and the first water-soluble material of the inner core having a greater water solubility than the second water-soluble material of the outer portion.

As a result of the first water-soluble material of the inner core having a greater water solubility than the second water-soluble material of the outer portion and the (at least one) surface of the inner core being exposed to ambient atmosphere, when the cartridge is contacted with water via the spray means, the inner core dissolves more rapidly than the outer core portion such that the inner agent of the inner core is released into the aqueous waste water collection system environment relatively quickly. Release of the outer agent from the outer core portion typically commences after release of the inner agent. Consequently, upon contact with water from the spray means, the contents of the inner core are advantageously released relatively quickly to provide an initial shock treatment of the waste water collection system while the contents of the outer agent are released over time to provide treatment of the waste water collection system over an extended period.

In one example, the inner core can release a high concentration of the inner agent quickly upon exposure with water via the spray means and thereby achieve (relatively) immediate treatment or restoration of a waste water collection system, followed by (relatively) sustained release of a lower concentration of the outer agent from the outer portion to thereafter maintain the waste water collection system. In this example, the inner agent and the outer agent can be from the same class of agents, i.e., for example, both can comprise bacteria or flocculants, etc.

In a further example, the inner agent released by the inner core can promote the efficacy of the outer agent released by the outer core. In this example, the inner agent and the outer agent can be from different classes of agents. For example, the inner core can initially release nutrients which can then facilitate more rapid and successful growth of bacteria subsequently released from the outer core portion. In another example, the inner core can release bacteria capable of degrading higher molecular weight organic matter into lower molecular weight organic matter and the outer portion can release bacteria capable of degrading the lower molecular weight organic matter produced by the bacteria of the inner core. In a further example, the inner core can release a flocculant capable of removing most contaminants from waste water by facilitating sludge formation and the outer portion can release bacteria capable of degrading the formed sludge. In an additional example, the inner core can release enzymes capable of accelerating breakdown of various types of organic matter and the outer portion can release bacteria capable of degrading the residual organic matter. Of course, combinations of oxygen generating materials, enzymes, bacteria, nutrients, and flocculants can be included in either the inner core or the outer portion.

In use, the solid dissolver system according to the invention is contacted with water to dissolve the first water-soluble material and/or the second water-soluble material to form a concentrated solution containing the inner agent and/or the outer agent. Specifically, water is directed via the spray means at a (typically bottom) surface of the cartridge. Because the inner core is exposed along the surface of the cartridge, and the first water-soluble material of the inner core has a greater water solubility than the second water-soluble material of the outer portion, the inner core is more readily dissolved such that a concentrated solution of the inner agent is formed. Such a concentrated solution can advantageously be used to quickly treat the waste water collection system. And further, because water directed at the exposed surface of the cartridge by the spray means continues to dissolve the second water-soluble material of the outer portion (even after the first water-soluble material is completely dissolved), a concentrated solution of the outer agent is formed and this can be used to continue the treatment of the water collection system for a relatively extended period of time. Thus, as the cartridge dissolves, the obtained solutions can facilitate degradation and digestion of organic matter present in any waste material present in the waste water collection system. For example, any released bacteria and enzymes digest organic matter in waste water (such as grease, feed, fat, and sludge), thereby dissipating strong odors and rendering the waste material more fluid. Any released flocculants facilitate sludge formation and thereby make subsequent digesting of the organic matter in the waste water by bacteria and/or enzymes more facile. Any released nutrients and oxygen generating materials promote growth of bacteria capable of digesting the organic matter. Dissolution of the cartridge contents to provide a concentrated solution of inner and/or outer agent(s) which can be collected and directed into a waste water collection system advantageously enhances the flow of water and waste material throughout the waste water collection system and increases the amount of waste material that can be processed therein.

As used, herein "waste water collection system" refers to at least one of a drain field, a lift station, a manhole inlet, a drain, a waste water stream, waste water sewer line, waste water pond, or a grease trap. Thus, the solid dissolver system 10 according to the invention can be used to treat any of the foregoing or combinations thereof.

Figure 1:
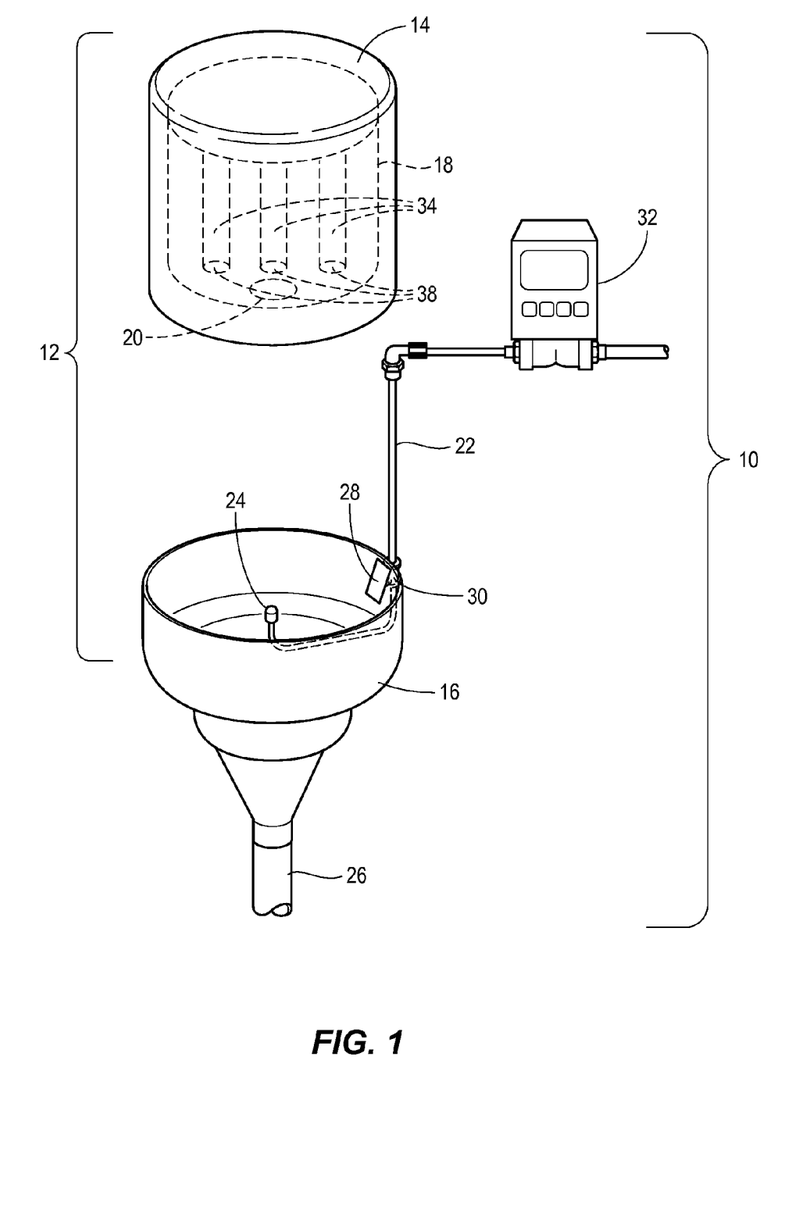
FIG. 1 is an exploded view of a solid dissolver system for the treatment of waste material according to the invention in which the cover is removed from the platform portion.
Figure 3:
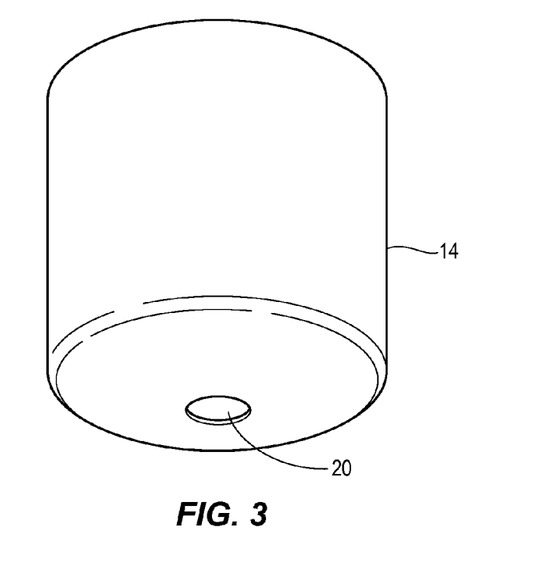
FIG. 3. is a bottom perspective view of the cover portion shown in FIG. 1.
Figure 5:
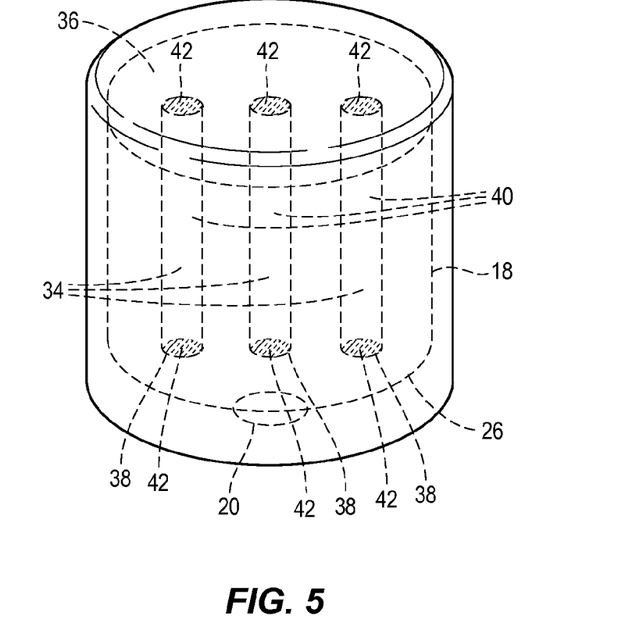

FIG. 1 is an exploded view of a solid dissolver system 10 for the treatment of waste material according to the invention. The solid dissolver system 10 includes a housing 12 comprising a cover 14 and a platform portion 16 for receiving the cover 14. A cartridge 18 containing agents for the treatment of waste material is disposed within the cover 14. As illustrated in FIGS. 3 and 5, the cover 14 substantially surrounds and envelops the cartridge 18 and includes an opening 20 therein. The cover 14 can comprise first and second portions (not shown) to facilitate disassembly of the cover 14 and permit replacement of the solid form cartridge 18. Alternatively, the cover 14 can include the cartridge 18 as a single integral unit such that the entire cover 14/cartridge 18 assembly can be replaced by the user as needed.

Figure 2:
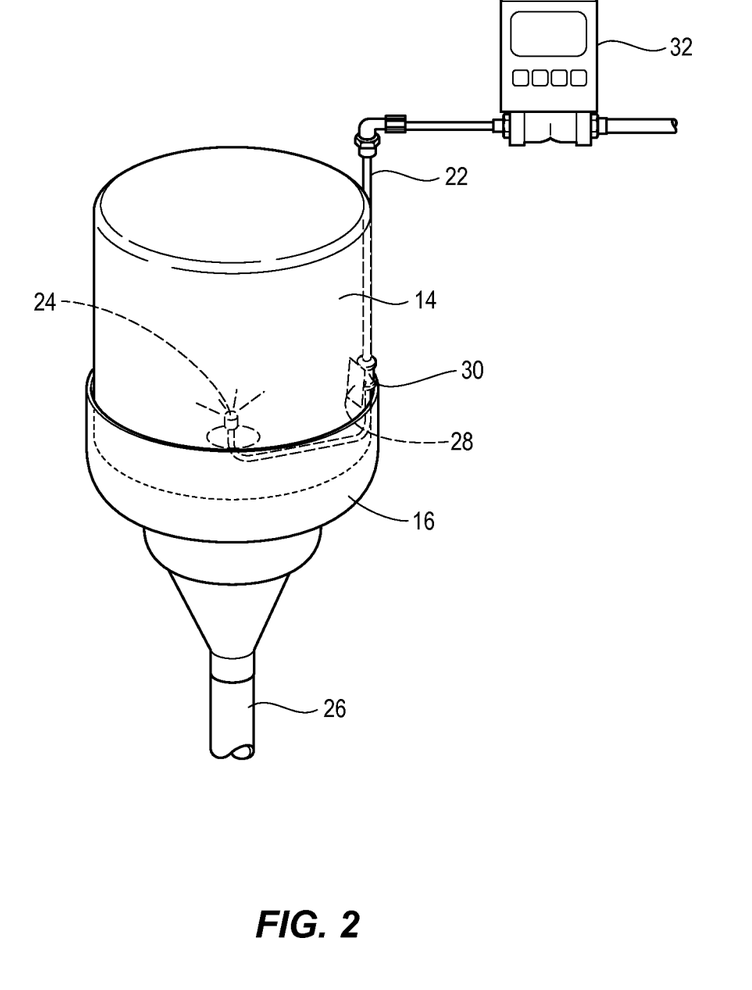
FIG. 2 illustrates the solid dissolver system shown in FIG. 1 with the cover received by the platform portion.

The solid dissolver system 10 also includes a water inlet 22 into the housing 12 which terminates at a spray means 24 disposed proximate to or inside the cover opening 20 when the cover 14 is received by the platform 16 (as best shown in FIG. 2). In some embodiments, the spray means 24 is positioned beyond the opening 20 of the cover 14 such that the spray means 24 is disposed within the interior of the cover 14 when the cover 14 is received by the platform 16 so as to facilitate maximum contact between the spray and the cartridge. Arranging the spray means 24 such that it is proximate to or inside the cover 14 facilitates the ability of the spray means 24 to direct water at a surface 26 of the cartridge 18. Typically, as illustrated in FIGS. 1 and 2, the spray means 24 is positioned to direct water at a surface 26 of the cartridge 18 which is a bottom surface, but other surfaces can also be used, for example, a side surface or a top surface. The interior of the platform portion 16 is configured to collect any effluent resulting from the water directed at the surface 26 of the cartridge 18 by the spray means 24 and direct the effluent into a water outlet 26, thereby channeling the effluent into a waste water collection system.

The solid dissolver system 10 can further include a cover sensor 28 operatively connected to the platform 16. The cover sensor 28 can advantageously sense when the cover 14 is seated on the platform 16, for example, such that water can freely flow though the water inlet 22 to the spray means 24 when the cover 14 is received by the platform 16. The cover sensor 28 can be a mechanical sensor or an electrical sensor. Further, the cover sensor 28 can be operatively connected to a water shutoff mechanism 30 to stop the flow of water, for example, when the cover 14 is not seated on the platform 16. As illustrated, the water shutoff mechanism 30 comprises a fluid valve which is operated/actuated by the cover sensor 28 and the cover sensor 28 comprises a mechanical lever.

The solid dissolver system can also include a timer/controller component 32. The timer/controller component 32 is operatively connected to the water inlet 22 and thus controls water flow into the housing 12. The timer/controller component 32 also includes a processor and can be set such that treatment of the waste water collection system is performed at predetermined intervals. The timer/controller component 32 can be powered using AC power or DC power (including battery power).

Figure 4:
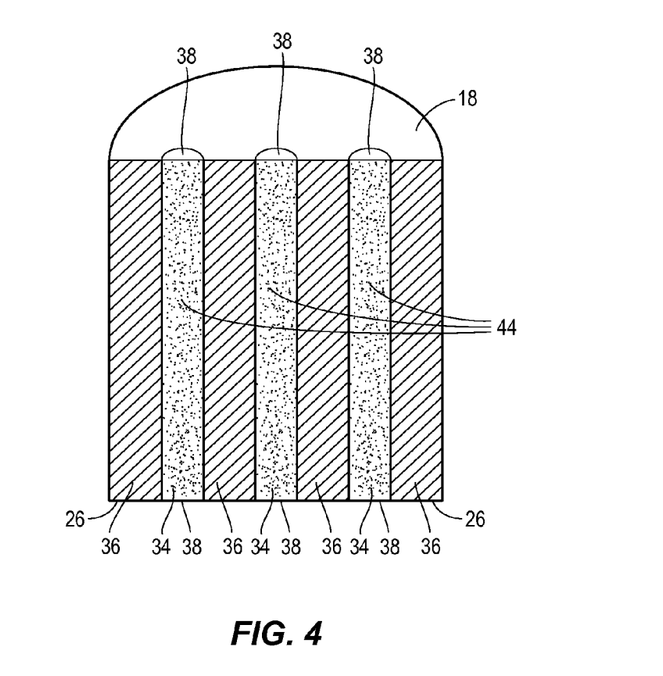
FIG. 4. illustrates a cross-sectional view of a cartridge according to the invention; and, FIG. 5 illustrates a cover substantially surrounding and enveloping the cartridge of FIG. 4.

FIG. 4. illustrates a cross-sectional view of the cartridge 18. In this representative embodiment of the invention, the cartridge 18 comprises three inner cores 34 and an outer portion 36 which (only) partially surrounds the inner cores 34. Because the outer portion 36 only partially surrounds the inner core(s) 34, typically at least one surface 38 of each inner core 34 is exposed along the surface 26 of the cartridge 18 such that the spray means can direct water at the surface 26 of the cartridge 18 and thereby dissolve the exposed at least one surface 38 of each inner core 34. In an alternative embodiment (not shown), one or more inner cores 34 can be recessed relative to the surface 26 of the cartridge 18 and fully surrounded by the outer portion 36 such that release of the contents therein does not occur until the most exterior surface 38 of the recessed inner core is exposed because of dissolution of the outer portion. Such a configuration allows sequential "shock" treatments to be effected using a single cartridge 18.

Although illustrated as having a cylindrical shape, the cartridge 10 of the present invention is not limited to any particular shape provided that it includes at least one inner core 34 and an outer portion 36 only partially surrounding the inner core 12, as described herein. Suitable alternative shapes for the device include but are not limited to spherical and rectangular. The cartridge 10 may be, for example, between about 5 and about 16 inches in height and have a diameter of between about 2 and about 10 inches. The cartridge 10 can also be provided in the shape of a puck, disk, pellet, or any other suitable shape. When formulated in a relatively small shape, e.g., pellet or other small shape, a number of cartridges 10 can be included in the housing 12. Such smaller shapes are particularly useful for treating waste material in smaller containment areas such as grease traps and the like.

Outer Portion

The outer portion 36 comprises an outer agent selected from the group consisting of oxygen generating materials, enzymes, bacteria, nutrients, flocculants, and mixtures thereof, bacteria and/or enzymes which is distributed in a binder matrix of a water-soluble material. As the outer portion 36 is dissolved by the spray, the outer portion releases the outer agent into the waste water collection system, thereby enhancing decomposition of waste materials such as floating grease and organic matter in the waste collection system, flow of such waste materials (and thus the flow of water), and the amount of waste material that can be processed. Suitable compositions for the binder matrix of the outer portion 36 and suitable bacteria for same are disclosed in U.S. Pat. Nos. 6,248,324 and 5,925,252, which are hereby incorporated herein by reference. Suitable matrix materials and bacteria are also described below.

The water-soluble binder matrix material of the outer portion 36 can comprise about 10% to about 50%, about 30% to about 40%, and/or about 33% to about 38% by weight of a blend of biodegradable surfactants. The surfactants and their concentration in the outer portion 36 are selected to easily structurally degrade by the water flow across their surface and to create critical micelle concentrations with the grease in the waste water containment area. The surfactants generally comprise hydrophilic and/or hydrophobic portions that easily form emulsions with the sewage material and/or grease present in the waste material by way of micelle formation. These surfactants preferably comprise, but are not limited to, nonionic surfactants and/or anionic surfactants.

Suitable nonionic surfactants include but are not limited to: alkanolamides (e.g., ethoxylated alkanolamides, mono-ethanolamides, mono-isopropanolamides, and modified alkanolamides), polyoxyethylene fatty alcohol ethers, polyoxyethylene sorbitan fatty acid esters, alkyl polyoxyethylene sulfates, polyoxyethylene fatty acid esters, sorbitan esters, glyceryl esters, glycerol monostearate, polyethylene glycols, polyethylene glycol esters, polypropylene glycols, polypropylene glycol esters, sorbitol esters (e.g., ethoxylated sorbitol esters), aromatic ethoxylates (e.g., octyphenol aromatic ethoxylates, nonylphenol aromatic ethoxylates, dionylphenol aromatic ethoxylates, dodecylphenol aromatic ethoxylates, and tristyrylphenol ethoxylates), alcohol ethoxylates (e.g., isotridecyl alcohol ethoxylates, isodecyl alcohol ethoxylates, and oleyl alcohol ethoxylates), cetyl alcohol, cetostearyl alcohol, stearyl alcohol, aryl alkyl polyether alcohols, polyoxyethylene-polyoxypropylene copolymers, poloxamers, poloxamines, methylcelluloses, hydroxycelluloses, hydroxymethylcelluloses, hydroxyethylcelluloses, hydroxypropylcelluloses, hydroxypropylmethylcelluloses, noncrystalline cellulose, polysaccharides, starch, starch derivatives, hydroxyethylstarch, polyvinyl alcohol, polyvinylpyrrolidone, coconut monoethanolamines, triethanolamine stearate, amine oxides, dextran, glycerol, gum acacia, cholesterol, tragacanth, glycerol monostearate, cetostearyl alcohol, cetomacrogol emulsifying wax, hydrogenated vegetable oil, sorbitan esters, polyoxyethylene alkyl ethers, polyoxyethylene castor oil derivatives, polyoxyethylene sorbitan fatty acid esters, polyethylene glycols, polyoxyethylene stearates, 4-(1, 1,3,3-tetramethylbutyl)phenol polymer with ethylene oxide and formaldehyde, poloxamers, alkyl aryl polyether sulfonates, mixtures of sucrose stearate and sucrose distearate, p-isononylphenoxypoly(glycidol), decanoyl-N-methylglucamide, n-decyl-β-D-glucopyrano side, n-decyl-β-D-maltopyranoside, n-dodecyl-β-D -glucopyranoside, n-dodecyl-β-D-maltoside, heptanoyl-N-methylglucamide, n-heptyl-β-D-glucopyranoside, n-heptyl-β-D-thioglucoside, n-hexyl-β-D-glucopyranoside; nonanoyl-N-methylglucamide, n-nonyl-β-D-glucopyranoside, octanoyl-N-methylglucamide, n-octyl-β-D-glucopyranoside, octyl-β-D-thioglucopyranoside, PEG-cholesterol, PEG-cholesterol derivatives, PEG-vitamin A, PEG-vitamin E, and random copolymers of vinyl acetate and vinyl pyrrolidone. The hydrophilic portion of the nonionic surfactant preferably comprises at least one and preferably multiple polar ether linkages derived from polymerization of ethylene oxide and/or propylene oxide.

Suitable anionic surfactants carry a negative charge on the hydrophilic portion, such as in the form of carboxylates, phosphates, sulfates, and/or sulfonates. Suitable anionic surfactants include but are not limited to: alkyl sulfonates, aryl sulfonates, alkyl phosphates, alkyl phosphonates, alkyl sulfates, ether sulfates, dodecylbenzene sulfonates, alpha olefin sulfonates, diphenyloxide disulfonate, alkyl naphthalene sulfonates, sulfosuccinates, sulfosuccinamates, naphthalene-formaldehyde condensates, sulfonesters, sulfoamides, fatty acid taurates, fatty acid isethionates, phosphate esters, ether carboxylates, potassium laurate, sodium lauryl sulfate, sodium dodecylsulfate, alkyl polyoxyethylene sulfates, sodium alginate, dioctyl sodium sulfosuccinate, phosphatidic acid and their salts, sodium carboxymethylcellulose, bile acids and their salts (e.g., cholic acid, deoxycholic acid, glycocholic acid, taurocholic acid, and glycodeoxycholic acid), calcium carboxymethylcellulose, carboxymethylcellulose sodium, stearic acid and its salts (e.g., calcium stearate), phosphates, sodium dodecylsulfate, dioctylsulfosuccinate, dialkylesters of sodium sulfosuccinic acid, phospholipids, and/or mixtures thereof. Suitable anionic surfactants can also be generated by combining lye and fatty acids such as palm oil, peanut oil, olive oil, soybean oil, vegetable oil, hydrogenated vegetable oil, safflower oil, sesame oil, peanut oil, coconut oil, sunflower oil, rapeseed oil, almond oil, cashew oil, hazelnut oil, pine nut oil, corn oil, orange oil, flax seed oil, and combinations thereof. Such surfactants can also be generated in the presence of a glycol or alcohol to prepare ester salts thereof.

The outer portion 36 binder matrix may additionally comprise about 1% to about 20% and/or about 3% to about 4% by weight of sodium thiosulfate which neutralizes the presence of chlorine ions in the waste system. The outer portion 36 may further comprise about 1% to about 20% and/or about 1% to about 2% by weight of citric acid.

The outer portion 36 binder matrix also typically includes sodium sulfate, sodium sulfite, sodium nitrate, sodium nitrite, and/or mixtures thereof. The cationic portion of the aforementioned salts may alternatively (or additionally) include calcium, potassium, or magnesium. The sulfate and/or sulfite ionic portions aid in the decomposition process through the sulfate reduction cycle, which reduces sulfides such as hydrogen sulfide ($H_2S$) and ferrous sulfide (FeS) which can create corrosion and odor problems in the waste system. The nitrate and/or nitrite ionic portions aid in the decomposition process through the nitrification cycle.

The outer portion 36 binder matrix further includes an outer agent selected from the group consisting of oxygen generating materials, enzymes, bacteria, nutrients, flocculants, and mixtures thereof. Frequently, the outer portion comprises bacteria and/or enzymes having a capacity for decomposing and/or degrading organic matter distributed therein. When present in the outer portion 36, a blend of bacteria of at least about 5 billion colony forming units (CFU's) per gram material or greater (e.g., at least 10 billion CFU's per gram, at least 20 billion CFU's per gram, or even more) typically are included in the outer portion 36 in an amount of about 10% to about 50%, about 30% to about 40%, and/or about 32% to about 38% by weight (based on the weight of the outer portion). Suitable genera of bacteria (defined herein as being inclusive of biovars thereof) for use in device 10 include are described below. Typically, the bacteria are spore state bacteria.

The dissolvability of the outer portion 36 may be increased or decreased by increasing or decreasing the surfactant concentration in the outer portion or by varying the functional group of the surfactant. For example, a class of surfactants commonly known as alkanolamine soaps is reacted by combining an amine and a fatty acid. A preferred embodiment of the present invention utilizes biodegradable alkanolamine surfactants having differing combinations of the amine and the fatty acid in order to adjust the dissolvability in accordance with the water flow of a specific waste collection system. For example, reaction of a coconut oil with monoethanolamine yields a relatively softer carrier that dissolves relatively fast in lower flow situations, whereas substitution of stearic acid for the coconut oil allows the carrier to be relatively slower in dissolving properties and more preferable for higher flow situations. Further, the surface texture of outer portion 36 can be solid/smooth, pitted, porous, or otherwise modified as known to those skilled in the art, in order to affect the dissolution rate thereof.

Inner Core

The inner core 34 is typically substantially surrounded by the outer portion 36, but at least one surface 38 of at least one inner core 34 is exposed along the surface of the cartridge. According to the invention, the water-soluble material of the inner core 34 has a greater water solubility than the water-soluble material outer portion 36. Because the water-soluble material of the inner core 34 has a greater water solubility than the water-soluble material of the outer portion 36 and at least one surface 38 of the inner core 34 is exposed along the surface 26 of the cartridge 14, such that when water is directed at the surface 26 of the cartridge 14, the contents/ingredients of the inner core 34 are released/dissolved to form a concentrated solution containing the inner agent and then the contents/ingredients of the outer core portion are released/dissolved to form a concentrated solution of the outer agent. Consequently, the (previously released) contents of the inner core 34 can advantageously improve the performance of the contents of the outer portion 36 upon release of the contents of the outer portion 36 into the waste water collection system. But, of course, it should be appreciated that the solution may contain either both the inner and outer agents as well.

As shown in FIG. 5, in one aspect, the inner core 34 of the solid dissolver system 10 comprises a hollow interior 40 and one or more end plugs 42 sealing said hollow interior 40. A granular inner agent can advantageously be disposed within the hollow interior(s) 40 and substantially instantaneously released upon dissolution of the end plug(s) 42. The one or more end plugs 42 of the inner core 34 are exposed along the surface 26 of the solid dissolver system 10. The end plugs 42 can provide the at least one surface 38 of the inner core 34 which is exposed along the surface 26 of the cartridge 14. The surface texture of the end plug(s) 42 of the inner core 34 can be solid/smooth, pitted, porous, or otherwise as known to those skilled in the art, in order to adjust the dissolution rate of the end plug(s) 42 of the inner core 34.

As illustrated in FIG. 4, in one aspect, the inner core 34 of the solid dissolver system 10 comprises a binder matrix material 44 partially contained within and/or surrounded by the outer portion 36. The binder matrix material 44 can substantially and continuously fill the outer portion provided that at least one surface 38 of the inner core 34 is exposed along the surface 26 of the cartridge 18 such that the spray means can direct water at the surface 26 of the cartridge 18 and thereby dissolve the same. Because the binder matrix material 44 dissolves faster than the binder matrix material of the outer core portion 36, it is necessarily different from the binder matrix material of the outer core portion 36. Although the end plugs 42 are not shown in conjunction with the device including the inner core 34 comprising the binder matrix material 44, a combination of end plugs 42 and binder matrix material 44 can also be used to provide the inner core 34 in accordance with the invention provided that the water-soluble materials of the end plugs 42 and the binder matrix material 44 have a greater water solubility than the water-soluble material of the outer portion 36.

In each instance, the water-soluble material of the inner core 34 has a greater water solubility than the water-soluble material of the outer portion 36. Preferably, the respective materials of the end plug(s) 42 and/or the binder matrix 44 have a water solubility value of greater than or equal to 1 mg/mL, preferably greater than or equal to 5 mg/mL, and even more preferably greater than or equal to 10 mg/ml. Both the end plug(s) 42 and the matrix 44 can comprise a water-soluble material selected from the group consisting of methylhydroxycelluloses, methylcelluloses, ethylcelluloses, hydroxyethylcelluloses, carboxymethylcelluloses, methylhydroxypropylcelluloses, hydrolyzed corn starches, hydrolyzed potato starches, gum arabic, guar gum, locust bean gum, carrageenans, karaya gums, ghatti gums, tragacanth agars, tamarind gums, xanthan gums, microcrystalline celluloses, sodium alginates, konjac glucomannans, pullulans, pectins, arabinogalactans, and mixtures thereof.

Further, in each of the aforementioned aspects, the inner core 34 can be colored using a different color (e.g., pigment or dye) than that of the outer portion 36. Using different colors for the end plug(s) 42 and/or the binder matrix 44 of the inner core relative to that of the outer portion 36 can facilitate a user's ability to detect whether the inner core 34 has been expended. Moreover, using different colors for the end plug(s) 42 and/or the binder matrix 44 relative to that of the outer portion 36 can also create a pleasing aesthetic effect.

When the solid dissolver system 10 comprises an inner core 34 having a hollow interior 40 and one or more end plugs 42 sealing said hollow interior 40, the inner agent may be provided in granular form. The granular nature of the inner agent of the inner core 34 can facilitate the release thereof from the inner core 34 such that it is substantially instantaneous once the end plug 42 dissolves.

Inner and Outer Agents

The inner core 34 and the outer portion 36 comprise at least one of oxygen generating materials, enzymes, bacteria, nutrients, and flocculants, as contents/ingredients which are released into the waste collection system.

Often, aerobic degradation of waste materials by bacteria is limited by oxygen availability in waste material present in the waste collection system. Thus, supplemental release of oxygen can speed digestion of solid wastes in the waste collection system. Specifically, the oxygen releasing materials are capable of enhancing and promoting the bacterial population dynamics by supplying the right oxygen requirements that bacteria need for their respiration processes. Suitable oxygen generating materials for the inner core and the outer portion may be selected from the group consisting of peroxides, percarboxylics, percarbonates, and mixtures thereof. Most preferably, the oxygen generating agent, if present, is contained in the inner core 34. Suitable oxygen generating materials are disclosed in U.S. Patent Publication No. 2006/0272205, which is hereby incorporated by reference. One exemplary commercially available oxygen generating material available in powder form is sold under the trade name OXY CAL™ (Rex-Bac-T Technologies, GA).

When present in the inner core 34 and/or the outer portion 36, a blend of enzymes may be used. Suitable enzymes are capable of accelerating breakdown of various types of organic matter frequently found in waste material. Typically, the enzymes are selected from lipases, amylases, proteases, xylanases, and cellulases (e.g., cellulase esterase). Suitable enzyme containing materials may contain lipases in an amount between 100 and 10,000 and/or 200-800 units per gram material, amylases in an amount between 10,000 and 200,000 and/or 20,000 and 100,000 units per gram material, proteases in an amount between 3000 and 100,000 and/or 15,000 and 60,000 units per gram material, and/or cellulases in an amount between 10 and 2000 and/or 50 and 500 units per gram material.

Suitable bacteria for the inner core 34 and outer portion 36 include but are not limited to gram positive bacteria such as *Bacillus licheniformis, Bacillus sphaericus, Bacillus subtilis, Bacillus pumilus, Bacillus amyloliquefaciens, Bacillus megaterium, Bacillus cereus, Bacillus thuringiensis, Bacillus polymyxa, Arthrobacter petroleophagus, Arthrobacter parraffineus, Rhodoccus erythropolis*, other strains of *Rhodocuccus*, and gram negative bacteria such as *Rhodobacter sphaeroides, Rhodobacter capsulatus, Pseudomonas putida, Pseudomonas aeruginosa, Pseudomononas stutzeri, Pseudomonas fluorescens, Achromobacter strains, Escherichia hermanii*, and/or mixtures thereof. Preferably, if included, bacteria in the inner core comprises rapid growth gram negative bacteria such as the gram negative bacteria identified above, which can greatly facilitate degradation by 'jump-starting' treatment of waste material in the waste collection system. When present, a blend of bacteria of at least about 5 billion colony forming units (CFU's) per gram material or greater (e.g., at least about 10 billion CFU's per gram, at least about 20 billion CFU's per gram or even more) can be included in the inner core 34 and/or outer portion 36. Spore state bacteria are preferred.

Nutrients can be included in the inner core 34 and/or the outer portion 36 to promote rapid and healthy growth of the bacteria (whether released initially from the inner core 34 or subsequently from outer core portion 36) in the waste material 16. Suitable nutrients include but are not limited to (trace) minerals, amino acids and vitamins. Suitable trace minerals include but are not limited to calcium, iron, magnesium, manganese, cobalt, copper, phosphorus, and zinc. Suitable amino acids include but are not limited to lysine, glycine, etc. Suitable vitamins include but are not limited to niacin, folic acid, ascorbic acid, vitamin A, vitamin B, vitamin D, vitamin E, and vitamin K. One exemplary commercially available oxygen generating material available in powder form is sold under the trade name MICROCLEAR M100™ (Environmental Leverage Inc., IL).

Flocculants can be included in the inner core 34 and/or the outer portion 36 to cause the solid organic and inorganic matter in the waste material 16 to flocculate and thereby facilitate sludge formation. Suitable flocculants (for both of the aforementioned inner core 34 aspects) include but are not limited to salts of multivalent metals, nonionic polymers, anionic polymers, and cationic polymers. Representative flocculants include ferric chloride, ferric sulfate, aluminum chloride, aluminum sulfate, polyacrylamide, poly(ethylene oxide), acidic compounds such as sulfuric acid, nitric acid and hydrochloric acid, dimethyl amine, epichlorohydrin, polysaccharides, mainly starch and its constituents, different types of gums, alginic acid, cellulose and its derivatives, dextran, amine homopolymers and amine copolymers containing diallyl dimethyl ammonium chloride, etc. In anionic polymer flocculants, two types of polymers are typically used: one type of polymers contain carboxyl functional groups, for example, such as poly(acrylic acid) and its derivatives; the other type of polymers contain sulfonic acid groups, for example, such as poly(styrene sulfonic acid) (PSSA). The cationic groups of the cationic polymer flocculants typically are derived by introducing quaternary ammonium groups onto the polymer backbone, although polymers containing sulfonium and phosphonium groups can be used. Cationic polymer flocculants can also be prepared by a reaction of a polysaccharide with various reagents possessing positively charged groups such as amino, imino, ammonium, sulfonium or phosphonium groups. Cationized polysaccharides are effective flocculants over a wide pH range, are non-toxic and exhibit good biodegradability. Specific exemplary powdered flocculants include but are not limited to cationic polyacrylamides sold under the SUPERFLOC® trade name such as SUPERFLOC® C-491 HMW, SUPERFLOC® C-492 HMW, SUPERFLOC® C-493 HMW, SUPERFLOC® C-494 HMW, SUPERFLOC® C-495 HMW, SUPERFLOC® C-496 HMW, SUPERFLOC® C-497 HMW, and SUPERFLOC® C-498 HMW (Cytec Industries Inc., CONN).

Representative Solid Dissolver Systems

Representative solid dissolver system 10 can include outer portions 36 and inner cores 34 containing blends of bacteria. In one example, the outer portion 36 can comprise a blend of *Bacillus licheniformis, Bacillus sphaericus, Bacillus subtilis, Bacillus pumilus, Bacillus megaterium*, and *Bacillus polymyxa*, and the inner core can comprise a blend of *Bacillus licheniformis, Bacillus sphaericus, Bacillus subtilis, Bacillus pumilus, Bacillus megaterium*, and *Bacillus polymyxa*, and a blend of *Pseudomonas fluorescens, Pseudomonas putida, Rhodobacter sphaeroides*, and *Rhodobacter capsulatus*. In a further example, the outer portion 36 can comprise a blend of *Bacillus licheniformis, Bacillus sphaericus, Bacillus subtilis, Bacillus pumilus, Bacillus megaterium*, and *Bacillus polymyxa*, and the inner core can comprise a blend of *Pseudomonas fluorescens, Pseudomonas putida, Rhodobacter sphaeroides*, and *Rhodobacter capsulatus*. In an additional example, the outer portion 36 can comprise a blend of *Bacillus licheniformis, Bacillus sphaericus, Bacillus subtilis, Bacillus pumilus, Bacillus megaterium*, and *Bacillus polymyxa*, and the inner core 34 can comprise a granular oxygen generating material. In another example, the outer portion 36 can comprise a blend of *Bacillus licheniformis, Bacillus pumilus, Bacillus subtilis, Bacillus amyloliquefaciens*, and *Bacillus megaterium*, and the inner core can comprise a blend of *Bacillus licheniformis, Bacillus sphaericus, Bacillus subtilis, Bacillus pumilus, Bacillus megaterium*, and *Bacillus polymyxa, Pseudomonas putida, Pseudomonas fluorescens*, granular lipase, and nutrients. In yet another example, both the inner core 34 and the outer portion 36 contain cationic polyacrylamides.

The outer portion 36 of the solid dissolver system 10 is typically formed by an extrusion process. According to this process, a liquid mixture of the water-soluble binder material of the outer portion 36 (which contains the outer agent) is extruded and dried to form a solid shaped portion (which will ultimately serve as the outer portion 36). The solid shaped portion 36 can then be cored to provide one or more openings through the solid shaped portion 36 which will ultimately serve as inner cores 34. The openings on one side of the solid shaped portion can then be capped, for example, with an end plug 42 or with additional water-soluble binder material of the outer portion 36 so the solid dissolver system 10 can then be filled with the inner agent. The inner agent can be provided substantially by itself, for example, as a granular or powdered material comprising the inner agent, or the inner agent can be distributed in a binder matrix different from the binder matrix of the outer portion 36. While the outer portion 36 can also be formed by a melt and pour process in which a traditional mold is used, such a process is generally not preferred because of its detrimental effect on the mortality and efficacy of the outer agent(s), particularly bacteria and enzymes.

The nature and amounts of the ingredients as well as the given physical dimensions of the solid dissolver system 10 are merely exemplary and are not meant to limit the practice of the present invention.

The invention claimed is:

1. A solid dissolver system for the treatment of waste material in a waste water collection system, comprising:
   a housing comprising a cover and a platform portion for receiving the cover;
   a cartridge containing agents for the treatment of waste material, the cartridge being disposed within the cover, the cover substantially surrounding and enveloping the cartridge, the cover comprising an opening;
   a water inlet into the housing, the water inlet terminating at a spray means disposed proximate to or inside the cover opening, the spray means being capable of directing water at a surface of the cartridge, the platform portion being capable of collecting any effluent from the water directed at the surface of the cartridge by the spray means; and a water outlet for channeling the effluent into a waste water collection system, wherein the cartridge comprises at least one inner core comprising a first water-soluble material, the inner core further comprising an inner agent selected from the group consisting of oxygen generating materials, enzymes, bacteria, nutrients, flocculants, and mixtures thereof, and an outer portion comprising an outer agent distributed in a binder matrix of a second water-soluble material, the outer portion partially surrounding the inner core such that at least one surface of the inner core is exposed along the surface of the cartridge, the outer agent being selected from the group consisting of oxygen generating materials, enzymes, bacteria, nutrients, flocculants, and mixtures thereof, the outer agent being the same or different from the inner agent, and the first water-soluble material of the inner core having a greater water solubility than the second water-soluble material of the outer portion.

2. The solid dissolver system according to claim 1, further comprising a cover sensor operatively connected to the platform, the cover sensor sensing when the cover is seated on the platform.

3. The solid dissolver system according to claim 2, wherein the cover sensor is operatively connected to a water shutoff mechanism to stop the flow of water when the cover is not seated on the platform.

4. The solid dissolver system according to claim 2, wherein the cover sensor is a mechanical sensor and the water shutoff mechanism is a fluid valve operated by the cover sensor.

5. The solid dissolver system according to claim 4, wherein the cover sensor comprises a mechanical lever.

6. The solid dissolver system according to claim 1, wherein the inner core comprises a hollow interior and one or more end plugs sealing said hollow interior, said end plugs comprising the first water-soluble material.

7. The solid dissolver system according to claim 6, wherein the end plugs comprise a material having a water solubility value of greater than or equal to 1 mg/mL.

8. The solid dissolver system according to claim 6, wherein the end plugs comprise a material selected from the group consisting of methylhydroxycelluloses, methylcelluloses, ethylcelluloses, hydroxyethylcelluloses, carboxymethylcelluloses, methylhydroxypropylcelluloses, hydrolyzed corn starches, hydrolyzed potato starches, gum arabic, guar gum, locust bean gum, carrageenans, karaya gums, ghatti gums, tragacanth agars, tamarind gums, xanthan gums, microcrystalline celluloses, sodium alginates, konjac glucomannans, pullulans, pectins, arabinogalactans, and mixtures thereof.

9. The solid dissolver system according to claim 6, wherein the inner agent is provided in the hollow interior in granular or powder form.

10. The solid dissolver system according to claim 1, wherein the inner agent comprises an oxygen generating material.

11. The solid dissolver system according to claim 1, wherein the inner agent is distributed in a binder matrix of the first water-soluble material.

12. The solid dissolver system according to claim 11, wherein the first water-soluble material is selected from the group consisting of methylhydroxycelluloses, methylcelluloses, ethylcelluloses, hydroxyethylcelluloses, carboxymethylcelluloses, methylhydroxypropylcelluloses, hydrolyzed corn starches, hydrolyzed potato starches, gum arabic, guar gum, locust bean gum, carrageenans, karaya gums, ghatti gums, tragacanth agars, tamarind gums, xanthan gums, microcrystalline celluloses, sodium alginates, konjac glucomannans, pullulans, pectins, arabinogalactans, and mixtures thereof.

13. The solid dissolver system according to claim 1, wherein the binder matrix of the second water-soluble material comprises a non-ionic surfactant.

14. The solid dissolver system according to claim 1, wherein the binder matrix of the second water-soluble material comprises an anionic surfactant.

15. The solid dissolver system according to claim 1, wherein the inner agent comprises an oxygen generating material selected from the group consisting of peroxides, percarboxylics, percarbonates, and mixtures thereof.

16. The solid dissolver system according to claim 1, wherein the inner agent and/or the outer agent comprises one or more enzymes selected from lipases, amylases, proteases, xylanases, and cellulases.

17. The solid dissolver system according to claim 1, wherein the inner agent and/or the outer agent comprises a material comprising $\geq 1 \times 10^{10}$ bacteria colony forming units per gram material.

18. The solid dissolver system according to claim 1, wherein the inner agent and/or the outer agent comprises one or more nutrients selected from the group consisting of minerals, vitamins, and amino acids.

19. The solid dissolver system according to claim 1, wherein the inner agent and/or the outer agent comprises one or more flocculants selected from the group consisting of salts of multivalent metals, nonionic polymers, anionic polymers, and cationic polymers.

20. The solid dissolver system according to claim 1, comprising two or more inner cores.

21. The solid dissolver system according to claim 1, wherein the color of the inner core is different from the color of the outer portion.

22. The solid dissolver system according to claim 1, wherein the waste water collection system comprises at least one of a drain field, a lift station, a manhole inlet, a drain, a waste water stream, waste water sewer line, waste water pond, or a grease trap.

23. A method of treating waste material in a waste water collection system, the method comprising:
providing a solid dissolver system for the treatment of waste material in a waste water collection system, comprising:
a housing comprising a cover and a platform portion for receiving the cover;
a cartridge containing agents for the treatment of waste material, the cartridge being disposed within the cover, the cover substantially surrounding and enveloping the cartridge, the cover comprising an opening;
a water inlet into the housing, the water inlet terminating at a spray means disposed proximate to or inside the cover opening, the spray means being capable of directing water at a surface of the cartridge, the platform portion being capable of collecting any effluent from the water directed at the surface of the cartridge by the spray means; and
a water outlet for channeling the effluent into a waste water collection system, wherein the cartridge comprises at least one inner core comprising a first water-soluble material, the inner core further comprising an inner agent selected from the group consisting of oxygen generating materials, enzymes, bacteria, nutrients, flocculants, and mixtures thereof, and an outer portion comprising an outer agent distributed in a binder matrix of a second water-soluble material, the outer portion partially surrounding the inner core such that at least one surface of the inner core is exposed along the surface of the cartridge, the outer agent being selected from the group consisting of oxygen generating materials, enzymes, bacteria, nutrients, flocculants, and mixtures thereof, the outer agent being the same or different from the inner agent, and the first water-soluble material of the inner core having a greater water solubility than the second water-soluble material of the outer portion;

spraying water from the spray means onto the surface of the cartridge to dissolve the first water-soluble material and/or the second water-soluble material to form a concentrated solution containing the inner agent and/or the outer agent; and, collecting and directing the concentrated solution into the waste water collection system.

24. The method according to claim 23, wherein the waste water collection system comprises at least one of a drain field, a lift station, a manhole inlet, a drain, a waste water stream, waste water sewer line, waste water pond, or a grease trap.

25. The method according to claim 23, wherein the inner core comprises a hollow interior and one or more end plugs sealing said hollow interior, said end plugs comprising the first water-soluble material.

26. The method according to claim 23, wherein the inner agent is distributed in a binder matrix of the first water-soluble material.

27. The method according to claim 23, wherein the cartridge comprises two or more inner cores.

* * * * *